April 7, 1953 E. G. ANGER 2,634,320
ELECTRIC CONTROL CIRCUIT
Filed March 7, 1950
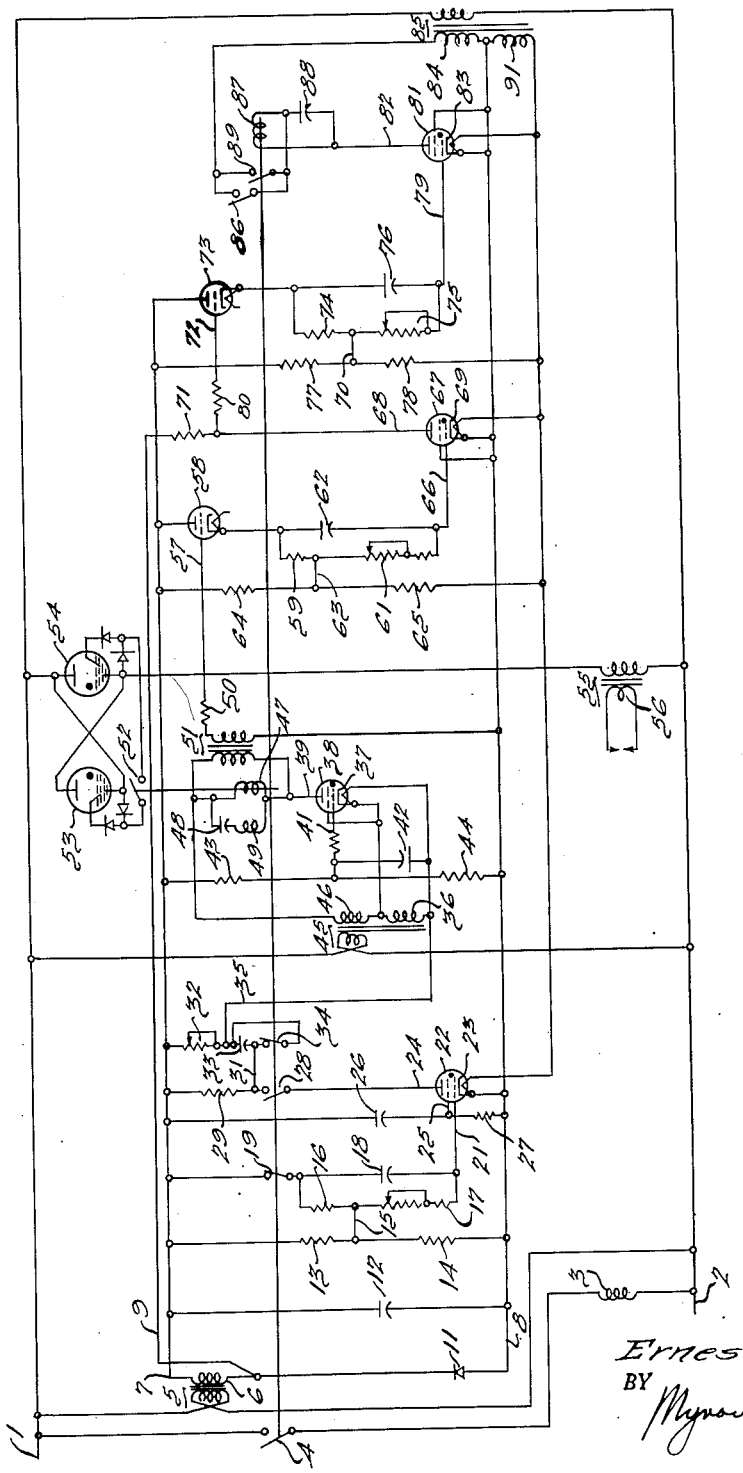
INVENTOR.
Ernest G. Anger.
BY
Myron J. Seibold
ATTORNEY.

Patented Apr. 7, 1953

2,634,320

UNITED STATES PATENT OFFICE 2,634,320

ELECTRIC CONTROL CIRCUIT

Ernest G. Anger, Wauwatosa, Wis., assignor to Square D Company, Detroit, Mich., a corporation of Michigan Application March 7, 1950, Serial No. 148,190

18 Claims. (Cl. 175—320)

This invention relates to a method for obtaining semi-synchronous weld firing.

More specifically, the invention relates to an electronic welding circuit in which weld current starts to flow at approximately the same point on the voltage wave each time a conducting period occurs, and in which accurate, full half cycle lead-trail action is obtained, both advantageous features being attained with certainty and economy.

One object of the present invention is the provision of a relay in a welding circuit which is energized by conduction of an electronic tube, and which is provided with components for insuring flow of welding current in full cycles with a full lead half cycle and accurate cut-off of welding current after the trail half cycle of weld current flows.

Another object of the present invention is the provision of an economical circuit arrangement for delaying the conduction of the electronic tube which energizes the aforementioned relay to insure a full half cycle of conduction through the relay coil.

It is a further object of this invention to provide a conventional back-to-back ignitron circuit arrangement with a firing contact controlled by a relay coil energized by an electronic circuit including an electronic tube, the relay coil being paralleled with capacitive and inductive elements which insure that the relay coil stays energized during the entire weld period and that the relay coil is rapidly and positively deenergized to effect synchronous termination of the weld.

Other objects and features of the invention will be readily apparent to those skilled in the art from the specification and appended drawing illustrating certain preferred embodiments in which:

The figure is a diagrammatic representation of a welding circuit including the circuit arrangement of applicant's invention.

In the figure, the numerals 1 and 2 represent a pair of main supply lines which are connected to a source of energy which is not illustrated. Connected across these lines 1 and 2 is a valve solenoid 3 controlled by a normally open contact 4. A transformer 5 having a secondary 6 is connected across the main supply lines 1 and 2, the secondary 6 serving to supply voltage to conductors 7, 8 and 9. A half-wave rectifier 11 in circuit with the secondary 6, cooperates with a smoothing capacitor 12 which is connected between the conductors 7 and 8, to provide these conductors with a pulsating D. C. voltage.

Serially disposed across the conductors 7 and 8 is a pair of resistors 13 and 14 which are connected by a conductor 15 to a timing circuit comprising a fixed resistor 16, a variable resistor 17 in series therewith, and a capacitor 18 connected in parallel with these two resistors, the advantage and details of this particular timing circuit being more particularly pointed out in applicant's copending application for Electric Timing Control filed March 7, 1950, Serial No. 148,191. This timing circuit is connected to the conductor 7 through a normally closed contact 19, and also to the control grid 21 of an electronic tube 22 having a cathode 23 and an anode 24, the cathode 23 being connected to conductor 8 and the anode 24 to conductor 7 through a normally open contact 28 and a resistor 29. Tube 22 has a shield grid 25 which is connected between a capacitor 26 and a resistor 27 serially disposed between the conductors 7 and 8.

Connected to the resistor 29 is a conductor 31 which serves to connect a timing circuit, comprising an adjustable resistor 32 and a capacitor 33 in series therewith, to the anode circuit of tube 22. The capacitor 33 is normally shorted out by a contact 34 which is normally closed. A conductor 35 is connected between the adjustable resistor 32 and the capacitor 33 and to a secondary 36 of a transformer 45, the primary of which is connected across lines 1 and 2, the secondary 36 serving to supply heat to the cathode 37 of an electronic tube 38. This tube has an anode 39 and a control grid 41 and the principal electrodes are supplied from a secondary 46 of the transformer 45. A capacitor 42 is connected between the control grid 41 and the cathode 37 of the tube 38, and to a point between a pair of voltage dividing resistors 43 and 44 which are serially disposed between the conductors 7 and 8. A relay coil 47 is disposed between the anode 39 of tube 38 and the transformer secondary 46, the relay coil 47 being paralleled by a capacitor 48 and an inductor 49, this parallel circuit being further paralleled by the primary of a transformer 51. The reactive qualities of the capacitor 48 and inductor 49 are chosen so that a substantial exchange of energy between these elements will occur.

The relay coil 47 controls the closure of a normally open contact 52 connected in a back-to-back circuit comprising ignitrons 53 and 54 conventionally disposed between the main lines 1 and 2 and serving to control the energization of a welding transformer 55 having a secondary 56 for passing current to the work to be welded. The stroke of this relay is designed so that contact 52 closes during the first half cycle following the first conducting half cycle of tube 38, and preferably at a point in that half cycle which approximately corresponds to a normal current zero point for a welding transformer of average power factor. The secondary of transformer 51 is connected through a resistor 56 to a control grid 57 of an electronic tube 58, the anode of which is connected to the conductor 7, the cathode being connected to a timing circuit comprising a fixed resistor 59, an adjustable resistor 61 in series therewith, and a parallel capacitor 62, a conductor 63 being connected between the fixed and variable resistors to introduce a voltage into the timing circuit from a second circuit comprising a resistor 64 and resistor 65, these latter resistors being serially connected between the conductor 7 and a cathode heater circuit to be subsequently explained.

The capacitor 62 is connected to a control grid 66 of an electronic tube 67 having an anode 68 and a cathode 69, the anode 68 being connected through a resistor 71 to the conductor 9 while the cathode 69 is connected to conductor 8. The resistor 71 is connected through another resistor 80 to a control grid 72 of an electronic tube 73, the anode of which is connected to the conductor 7, while the cathode is connected to another timing circuit comprising a fixed resistor 74 and a variable resistor 75 in series therewith, the series circuit being paralleled by a capacitor 76. A voltage is introduced into this timing circuit by a conductor 70 from a series circuit comprising a resistor 77 and a resistor 78, these resistors being serially disposed between conductors 7 and the aforementioned cathode heater circuit.

The capacitor 76 is connected to a control grid 79 of an electronic tube 81, having an anode 82 and a cathode 83, these electrodes of tube 81 being connected across one secondary 84 of a transformer 85 through a normally open manually operated switch 86 and a relay coil 87, a capacitor 88 paralleling the relay coil. The primary of transformer 85 is connected across the supply lines 1 and 2. The relay coil controls the operation of a contact 89 which is normally open and which parallels the manually operated switch 86, this relay coil also controlling the operation of contacts 4, 19, 28 and 34. A second secondary 91 of transformer 85 supplies the cathode heaters of tubes 22, 67, and 81.

In the description of the circuit, conventional elements such as surge bypass capacitors, fuses, thermal flow switches, and other conventional elements have been eliminated although these would be present in an operating circuit. This elimination of conventional parts has been effected for purposes of simplicity, their position and function being well known to those familiar with the art.

Prior to the operation of the manually operated switch 86, the valve solenoid 3 is deenergized as contact 4 is open. Contact 19 is closed, and capacitor 18 is charged to approximately the full voltage between conductors 7 and 8 through control grid rectification of tube 22. Contact 28 is, as illustrated, in an open condition thus disconnecting the anode 24 of tube 22 from the conductor 7. The contact 34 is closed, thereby shorting out capacitor 33, and the contact 89 is open, no path from secondary 84 through the tube 81 therefore existing. These contacts are mechanically arranged so that the normally closed contacts 19 and 34 will open before the normally open contacts 4, 28 and 89 close.

Upon closure of the manually operated switch 86, tube 81 will begin to conduct as soon as secondary 84 drives the anode 82 positive with respect to the cathode 83, the conduction of this tube serving to energize the relay coil 87. During the half cycle in which tube 81 does not conduct, due to improper polarity of the transformer secondary 84, the capacitor 88 serves to maintain the relay coil 87 in an energized condition in the conventional manner. As contact 19 opens, the control grid 21 of tube 22 is swept negative with respect to the cathode 23 of that tube due to the charge on capacitor 18. As contact 34 opens, the short across capacitor 33 is eliminated. As the contact 4 then closes, the valve solenoid 3 is energized and the welding electrodes act to apply pressure to the work in the conventional manner to start the "squeeze time" period. Closure of contact 28 completes the anode circuit of tube 24, but this tube cannot begin to conduct due to the charge on capacitor 18. Closure of contact 89 forms a nonbeat holding circuit across the manually operated switch 86.

Tube 22 remains in the quiescent condition aforementioned for a period determined by the timing elements including the capacitor 18 and the resistors 16 and 17 in parallel therewith, these elements determining the length of the "squeeze time" period. The arrangement of the resistors 16 and 17 paralleling capacitor 18, this arrangement being fully and accurately described in the aforementioned copending application, is such that the voltage difference between the control grid 21 and the cathode 23 is always slowly dissipated, thereby permitting control over the actual moment of initiating conduction of tube 22 by the pulsating voltage applied to the shield grid 25 of the tube 22, this pulse of positive voltage to the shield grid 25 occurring during the momentary conduction of the half wave rectifier 11, shield grid 25 rectification of tube 22 serving to aid the accuracy of control by clipping off any undue changes of pulse value due to line variations. Therefore, as the voltage difference between the control grid and the cathode of tube 22 is diminished, this tube is finally rendered conducting at a point determined by a positive pulse of voltage supplied to the shield grid 25.

Prior to the conduction of tube 22, the control grid 41 of the tube 38 is negative with respect to the cathode 37 of that tube. The capacitor 42 is charged with a polarity according to this voltage difference. As tube 22 begins to conduct, the conductor 35 tends to carry the cathode 37 of tube 38 a negative amount due to the voltage drop across the adjustable resistor 32, this drop being due to conduction current of the tube 22. This has a tendency to cause the cathode 37 of tube 38 to become negative with respect to the control grid, but the charge on capacitor 42 momentarily prevents this occurrence. Inasmuch as tube 22, as previously mentioned, is rendered conducting by a positive pulse of voltage upon the shield grid 25 thereof, this positive pulse occurring adjacent to the mid point of a half cycle of voltage, if the capacitor 42 were not present tube 38 might begin to conduct during the latter half of a half cycle, thereby permitting a premature partial pulse of current through relay coil 47. Capacitor 42 prevents this unfavorable occurrence, the charge on the capacitor 42 being rapidly dissipated, however, through the resistors 43 and 44 so that precisely at the beginning of the next positive excursion of anode 39 voltage, tube 38 will conduct to energize the relay coil 47, the conduction therefore occurring only during a whole half cycle.

As current passes from the secondary 46 of transformer 45 through the relay coil 47 and the electronic tube 38, the armature of the relay acts to close the normally open contact 52 to cause the conventionally disposed ignitrons 53 and 54 to pass current through the welding transformer. The mechanical delay of the relay is designed to be such that its contacts close during the half cycle of voltage immediately succeeding the first half cycle of conduction through the relay coil 47, and preferably at the proper instant in that half cycle for initiation of a normal wave of current for welding transformers of usual power factor. Thus objectionable transients due to initiation of current at improper instants are avoided. Furthermore, current flow through the welding transformer always starts during the same polarity of the alternating voltage wave, therefore starting initial current flow always in the same direction. During the half cycles of non-conduction of the tube 38, the capacitor 48 discharges through the relay coil 47 to maintain the relay in an energized condition. Tube 38 will continue to conduct and the relay coil 47 will remain energized, for a period determined by the timing combination comprising the adjustable resistor 32 and the capacitor 33. As conduction current of tube 22 passes through the resistor 32 and the capacitor 33 and subsequently through tube 22, a charge is built up upon the capacitor 33 until this charge is sufficiently large to cause the cathode 37 of the tube 38 to become positive with respect to the control grid 41 thereof. When this condition prevails, tube 38 is cut off and no longer conducts. The time required to build a charge on capacitor 33 therefore determines the "weld time." Throughout this time current is conducted alternately in both directions by the ignitrons in the customary manner.

During the first half cycle after tube 38 stops conducting, capacitor 48 will act, as before described, to keep the relay coil 47 energized; during the half cycle following this occurrence, the inductor 49, which is in series with the capacitor 48, causes a definite and sharp reversal of current flow through the relay coil 47 to cause rapid and synchronous deenergization thereof, the contact 52 thereby returning to its normal open condition rapidly and with certainty during this half cycle. The mechanical delay of the relay further provides that this opening will not occur until after the "trail" ignitron has begun to conduct but will occur before it has ceased to conduct, the "trail" ignitron then conducting to the normal current zero. It will therefore be seen that current will flow during two, and only two, half cycles following the last half cycle of tube 38 conduction. It will further be seen that the last pulse of energy through the welding transformer will always have the same polarity. As has been previously indicated, weld current flow always starts with the opposite polarity.

During the period in which tube 38 conducts, the primary of transformer 51 is energized, the secondary of transformer 51 driving the grid 57 of electronic tube 58 sufficiently positive to cause that tube to conduct. This conduction charges capacitor 62 through control grid 66 conduction of electronic tube 67. These pulses occur during the time when the anode 68 of tube 67 is negative with respect to the cathode 69 thereof, so that the tube 67 is immediately cut off by the charge on capacitor 62 and does not, therefore, conduct during the period in which tube 38 conducts.

The timing arrangement in the grid circuit of electronic tube 67 is that described in the aforementioned copending application, and acts to permit the voltage of the cathode and grid to slowly approach a single value. Superimposed upon the decreasing voltage of capacitor 62 is a synchronizing, alternating ripple fed into the voltage divider circuit which comprises resistors 64 and 65, from the secondary 91. Tube 67 will therefore remain non-conductive until capacitor 62 has properly discharged through the circuit in parallel therewith; the actual instant of initiation of conduction being controlled by the positive drive of the synchronizing pulse.

Throughout the period in which tube 67 is quiescent, the control grid 72 of tube 73 is at approximately the potential of conductor 9 and is intermittently sufficiently positive so that the tube 73 will conduct to charge capacitor 76 through control grid 79 conduction of electronic tube 81. Inasmuch as these current pulses occur during the half cycles in which the anode 82 of the tube 81 is positive with respect to the cathode 83 of that tube, tube 81 is not immediately cut off, as was the case with tube 67. Tube 81 will therefore continue to conduct until the before-described timing control voltages of tube 67 are such that that tube 67 will again resume conduction. The elements which determine these timing voltages thereby control the "hold time" of the circuit. The conduction of tube 67 will no longer permit the grid 72 of tube 73 to become sufficiently positive to permit tube 73 to conduct, so the charge on capacitor 76 cuts off tube 81 as soon as tube 67 begins to conduct. The timing circuit controlling conduction of tube 81 is the same as that before described for the control of the tube 67, and therefore this function will not now be described. As soon as tube 81 is cut off, the relay coil 87 is deenergized and the contacts which it controls are returned to the position indicated in the drawing. Immediately after the circuit controlling the control grid 79 of tube 81 has timed out, this circuit controlling the "off" time in the welding cycle, tube 81 will once again conduct, provided initiated contact 86 is closed, to initiate another cycle as herein described.

It will be obvious that with the particular circuit arrangement of applicant's invention, semi-synchronization of the weld is effected by employing a positive crest of voltage, transmitted from a half wave rectifier to a parallel capacitor circuit, to control this synchronization effect, and that furthermore this natural synchronization process is delayed so that only full half cycles of coil current may occur in this circuit. The actual instant of initiation of weld current flow, which in this circuit is dependent upon fixed mechanical delay in closure of a relay, may not be as accurately controlled as in a circuit employing electronic elements solely. However, the power transients which have been found to occur are sufficiently small so that this relatively inexpensive arrangement has been proven to be of great utility. Furthermore, with this circuit the relay coil which controls the passage of current through the welding load is associated with elements which insure accurate, positive, rapid and synchronous deenergization of this relay coil so that the contact controlled by this coil is always opened in a manner which permits only full half cycles of "trail" conduction to occur, with weld current always being terminated at the end of this "trail" half cycle. It will furthermore be seen that these advantageous results are achieved in an economical manner and with absolutely dependable elements.

As an example of one set of values for the various circuit components illustrated in the figure, these components may have the following characteristics:

Resistors:
- 13 _____ 750K (kilohms)
- 14 _____ 110K
- 16 _____ 75K
- 17 _____ 2.01M (megohms) max. adjustable
- 27 _____ 15M
- 29 _____ 20K
- 32 _____ 2.02M
- 43 _____ 180K
- 44 _____ 160K
- 41 _____ 2M
- 50 _____ 510K
- 64 _____ 1.8M
- 65 _____ 1M
- 59 _____ 20K
- 61 _____ 2.02M (max. adjustable)
- 71 _____ 91K
- 80 _____ 510K
- 77 _____ 1.3M
- 78 _____ 200K
- 74 _____ 20K
- 75 _____ 2.02M (max. adjustable)

Capacitors:
- 12 _____ 15 (in microfarads)
- 18 _____ 0.5
- 26 _____ 0.005
- 33 _____ 2
- 42 _____ 0.02
- 48 _____ 5
- 62 _____ 0.5
- 76 _____ 0.5
- 88 _____ 8

Rectifier:
- 11 _____ 75MA., 130V.

Tubes:
- 22, 38, 67, 81 ___ 2050
- 58, 73 _____ 6J5

Relay coil 47 has 3350 turns of No. 31 wire, 138 ohms resistance, 800 ohms reactance—relay sealed. The relay stroke is designed to close the contacts controlled thereby at approximately 250 degrees after the initial energization of the coil, and open the contacts at about 350 degrees on the voltage wave (60 cycles) when used with the tuned circuit described and energized by synchronized half wave pulses.

Inductor 47 has a coil of 1400 turns No. 30 wire, 58 ohms resistance, 600 ohms reactance with 0.005" air gap, the air gap being adjusted to accomplish the operation described above.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a control circuit having means energized by an electronic tube to effect a control function, an electronic tube having at least an anode and cathode and a control electrode, a source of alternating voltage, means connecting said electronic tube across said source of voltage, means establishing a point of first potential, means establishing a point of second potential, means connecting the control electrode of said electronic tube to said point of first potential, means connecting the cathode of said electronic tube to said point of second potential, said second potential being normally greater in value than said first potential so that said electronic tube cannot conduct, means for synchronously lowering the value of said second potential to a value to render said electric valve conductive, said last mentioned means always operating at substantially the same point of the source voltage wave, and a capacitor connecting the cathode and control electrode of said electronic tube and delaying the relative change in voltage between the cathode and control electrode after operation of said potential lowering means whereby said electronic tube will become conductive a predetermined time after the operation of said potential lowering means.

2. In a circuit arrangement for effecting operation of a relay, a source of alternating voltage, an electronic tube, means connecting said electronic tube across said source of voltage, a relay coil connected in series circuit with said electronic tube and energized upon current flow between the principal electrodes thereof, capacitive energy storing means in circuit with said relay coil for maintaining current flow in the normal direction through said relay coil during the half cycle following a period of conduction of said electronic tube to maintain said relay coil energized, and an inductive element serially connected with said capacitive means, said serial connection forming a parallel circuit with said relay coil, said capacitive means and inductive element having reactive values of such magnitude that a substantial exchange of energy occurs therebetween following the aforesaid half cycle so that said relay coil is rapidly deenergized, and means associated with said relay coil and operated upon energization thereof to effect a control function.

3. In a circuit arrangement for effecting operation of a relay, an electronic tube having at least an anode and cathode and a control electrode, a source of alternating voltage, means connecting said electronic tube across said source of voltage, means establishing a point of first potential, means establishing a point of second potential, means connecting the control electrode of said electronic tube to said point of first potential, means connecting the cathode of said electronic tube to said point of second potential, said second potential normally being greater in value than said first potential so that said electronic tube cannot conduct, means for synchronously lowering the value of said second potential to a value below that of said first potential to render said electronic tube conductive, a capacitor connecting the cathode and control electrode of said electronic tube and delaying the relative change in voltage between the cathode and control electrode after operation of said potential lowering means, a relay coil connected in series circuit with said electronic tube and energized upon current flow between the principal electrodes thereof, capacitive energy storing means in circuit with said relay coil for maintaining current flow in the normal direction through said relay coil during the half cycle following a period of conduction of said electronic tube to maintain said relay coil energized, and an inductive element serially connected with said capacitive means, said serial connection forming a parallel circuit with said relay coil, said capacitive means and inductive element having reactive values of such magnitude that a substantial exchange of energy occurs therebetween following the aforesaid half cycle so that said relay coil is rapidly deenergized, and means associated with said relay coil and operated upon energization thereof to effect a control function.

4. In a control circuit having means energized by an electronic tube to effect a control function, an electronic tube having at least an anode and cathode and a control electrode, a source of alternating voltage, means connecting said electronic tube across said source of voltage, a supply of direct voltage, a first resistance element connected across said supply of voltage and establishing a point of first potential, a second resistance element connected to said supply of voltage and establishing a point of second potential, means connecting the control electrode of said electronic tube to said point of first potential, means connecting the cathode of said electronic tube to said point of second potential, said second potential normally being greater than said first potential so that said electronic tube cannot conduct, means for passing current through said second resistance element to lower the value of said second potential to a value to render said electronic tube conductive, said last mentioned means always operating at substantially the same point of the source voltage wave, and a normally charged capacitor connecting the control electrode and cathode of said electronic tube, said charged capacitor discharging after operation of said potential lowering means and delaying the relative change in voltage between the cathode and control electrode of said electronic tube during the discharge period, whereby said electronic tube will become conductive a predetermined time after the operation of said potential lowering means.

5. In a circuit arrangement for effecting operation of a relay, an electronic tube having at least an anode and cathode and a control electrode, a source of alternating voltage, means connecting said electronic tube across said source of voltage, a first resistance element connected across said source of voltage and establishing a point of first potential, a second resistance element connected to said source of voltage and establishing a point of second potential, means connecting the control electrode of said electronic tube to said point of first potential, means connecting the cathode of said electronic tube to said point of second potential, said second potential normally being greater than said first potential so that said electronic tube cannot conduct, means for passing current through said second resistance element to lower the value of said second potential to a value to render said electronic tube conductive, said last mentioned means always operating at substantially the same point of the source voltage wave, a normally charged capacitor connecting the control grid and cathode of said electronic tube, said charged capacitor discharging after operation of said current passing means and delaying the relative change in voltage between the cathode and control electrode of said electronic tube during the discharge period, a relay coil connected in series circuit with said electronic tube and energized upon current flow between the principal electrodes thereof, capacitive energy storing means in circuit with said relay coil for maintaining current flow in the normal direction through said relay coil during the half cycle following a period of conduction of said electronic tube to maintain said relay coil energized, and an inductive element serially connected with said capacitive means, said serial connection forming a parallel circuit with said relay coil, said capacitive means and inductive element having reactive values of such magnitude that a substantial exchange of energy occurs therebetween following the aforesaid half cycle so that said relay coil is rapidly deenergized, and means associated with said relay coil and operated upon energization thereof to effect a control function.

6. In a control circuit having means energized by an electronic tube to effect a control function, an electronic tube having at least an anode and cathode and a control electrode, a source of periodically varying voltage, means connecting said electronic tube across said source of voltage, a first resistance element connected across said source of voltage and establishing a point of first potential, a second resistance element connected to said source of voltage and establishing a point of second potential, means connecting the control electrode of said electronic tube to said point of first potential, means connecting the cathode of said electronic tube to said point of second potential, said second potential normally being greater than said first potential so that said electronic tube cannot conduct, a second electronic tube for passing current through said second resistance element to lower the value of said second potential to a value to render said electronic tube conductive, means for effecting conduction of said electronic tube at substantially the same point of the source voltage wave, a normally charged capacitor connecting the control electrode and cathode of said electronic tube, said charged capacitor discharging after operation of said potential lowering means and delaying the relative change in voltage between the cathode and control electrode of said electronic tube during the discharge period, whereby said electronic tube will become conductive a predetermined time after the operation of said second electronic tube is begun, and means in series circuit with said second resistance element and said second electronic tube for restoring the value of said second potential to substantially its original value to terminate the period of conduction of said first mentioned electronic tube.

7. In a circuit arrangement for effecting operation of a relay, an electronic tube having at least an anode and cathode and a control electrode, a source of alternating voltage, means connecting said electronic tube across said source of voltage, a first resistance element connected across said source of voltage and establishing a point of first potential, a second resistance element connected to said source of voltage and establishing a point of second potential, means connecting the control electrode of said electronic tube to said point of first potential, means connecting the cathode of said electronic tube to said point of second potential, said second potential normally being greater than said first potential so that said electronic tube cannot conduct, a second electronic tube for passing current through said second resistance element to lower the value of said second potential to a value to render said electronic tube conductive, means for effecting conduction of said electronic tube at substantially the same point of the source voltage wave, a normally charged capacitor connecting the control grid and cathode of said electronic tube, said charged capacitor discharging after operation of said second electronic tube and delaying the relative change in voltage between the cathode and control electrode of said first mentioned electronic tube during the discharge period, a relay coil connected in series circuit with said electronic tube and energized upon current flow between the principal electrodes thereof, capacitive energy storing means in circuit with said relay coil for maintaining current flow in the normal direction through said relay coil during the half cycle following a period of conduction of said electronic tube to maintain said relay coil energized, and an inductive element serially connected with said capacitive means, said serial connection forming a parallel circuit with said relay coil, said capacitive means and inductive element having reactive values of such magnitude that a substantial exchange of energy occurs therebetween following the aforesaid half cycle so that said relay coil is rapidly deenergized, and means associated with said relay coil and operated upon energization thereof to effect a control function, and means in series circuit with said second resistance element and said second electronic tube for restoring the value of said second potential to substantially its original value to terminate the period of conduction of said first mentioned electronic tube.

8. In a control circuit arrangement, an electronic tube having at least an anode and cathode and a control electrode, a source of alternating voltage, means connecting said electronic tube across said source of voltage, rectifying means, means energized through said rectifying means and controlling the potential of said control electrode, said last mentioned means operating synchronously with said source of voltage and applying a triggering potential to said control electrode at substantially the same point on the voltage wave during each operating period whereby said electronic tube is synchronously rendered conductive, and means responsive to current flow through said electronic tube to effect a control function.

9. In a circuit arrangement for effecting operation of a relay, an electronic tube having at least an anode and cathode and a control electrode, a source of periodically varying voltage, means connecting said electronic tube across said source of voltage, means for initiating the conduction of said electronic tube at a predetermined phase relation to said varying voltage, a relay coil connected in series with said electronic tube, means associated with said relay coil and operating upon energization of said coil to effect a control function, said last mentioned means operating only after a predetermined length of time following the initial energization of said relay coil to insure the control function is initiated at an instant having a particular relationship to the source voltage wave, and means for terminating the operation of said last mentioned means after predetermined length of time following the deenergization of said relay coil.

10. In a control circuit arrangement, an electronic tube having at least an anode and cathode and a control electrode, a source of periodically varying voltage, means connecting said electronic tube across said source of voltage, rectifying means, means energized through said rectifying means and controlling the potential of said control electrode, said last mentioned means operating synchronously with said source of voltage and applying a triggering potential to said control electrode at substantially the same point on the voltage wave during each operating period, a relay coil in series with said electronic tube, means associated with said relay coil and operating upon energization of said coil to effect a control function, said means for effecting a control function operating only after a predetermined length of time following the initial energization of said relay coil to insure the control function is initiated at an instant having a particular relationship to the source voltage wave, and means for terminating the operation of said means for effecting a control function after predetermined length of time following the deenergization of said relay coil.

11. In a circuit arrangement for effecting operation of a relay, an electronic tube having at least an anode and cathode and a control electrode, a source of voltage, means connecting said electronic tube across said source of voltage, means establishing a point of first potential, means establishing a point of second potential, means connecting the control electrode of said electronic tube to said point of first potential, means connecting the cathode of said electronic tube to said point of second potential, said second potential normally being greater in value from said first potential so that said electronic tube cannot conduct, synchronously operating means for lowering the value of said second potential to a value to render said electronic tube conductive, a capacitor connecting the cathode and control electrode of said electronic tube, and delaying the relative change in voltage between the cathode and control electrode after operation of said potential lowering means, a relay coil connected in series with said electronic tube, means associated with said relay coil and operating upon energization of said coil to effect a control function, said means for effecting a control function operating only after a predetermined length of time following the initial energization of said relay coil to insure the control function is initiated at an instant having a particular relationship to the source voltage wave, and means for terminating the operation of said means for effecting a control function after a predetermined length of time following the deenergization of said relay coil.

12. In a control circuit for effecting the passage of alternating current to a load, a source of alternating voltage, an electronic tube energized by said source, a relay having its operating coil in series with said tube and energized by current flow therethrough, a switch operated by said relay means for passing current to said load during the period said switch is operated, means for initiating conduction of said electronic tube at a predetermined phase position relative to said alternating voltage whereby said coil is synchronously energized, said relay having a fixed delay between the moment of initial energization and the moment of operation of said switch, closure of said switch thereby being effected by said relay a predetermined time after energization of said relay whereby said switch is closed to initiate current flow through the load at a predetermined phase position relative to said alternating voltage.

13. In a control circuit for effecting the passage of alternating current to a load, a source of alternating voltage, an electronic tube energized by said source, a relay having its operating coil in series with said tube and energized by conduction thereof, a switch controlling load current flow operated by said relay for initiating load current flow, means for passing current to said load during the period of operation of said switch, means for initiating conduction of said electronic tube at a predetermined phase position relative to said alternating voltage whereby said coil is synchronously energized, said relay having a fixed delay between the moment of initial energization and the moment of operation of said switch, closure of said switch thereby being effected by said relay a predetermined time after energization of said relay whereby said switch is closed to initiate current flow through the load at a predetermined phase position relative to said alternating voltage, timing means for interrupting current flow through said tube after a predetermined conducting period, and energy storing means in circuit with the coil of said relay for effecting its deenergization a predetermined time following the cessation of said tube's conduction to effect the opening of said switch.

14. In a control circuit for effecting the passage of an even number of half cycles of alternating current to a load, a source of alternating voltage, an electronic tube having an anode, a cathode, and a control electrode, means connecting said tube across said source, a relay having its coil in series with said tube and energized by conduction thereof, a switch controlling load current flow and operated by said relay for initiating the current flow through the load, means responsive to the operation of said switch for passing current to the load, means for establishing a point of first potential, means for establishing a point of second potential normally greater than the first potential, means connecting said control electrode to said point of first potential, means connecting said cathode to said point of second potential whereby said tube is normally prevented from conducting, means for synchronously lowering the value of said second potential to a value sufficient to render said tube conducting whereby said tube will begin to conduct and thereby energize said relay coil in a predetermined phase position relative to said alternating voltage, said relay having a fixed delay between the moment of initial energization and the moment of operation of said switch, closure of said switch being effected by said relay a predetermined time after energization of said coil whereby said switch is closed to initiate current flow through the load at a predetermined phase position relative to said alternating voltage and during a half cycle of a first polarity, means for synchronously interrupting a period of said tube's conduction, and means for effecting the deenergization of said relay and the subsequent opening of said switch a predetermined time following the cessation of current flow through said tube and during a half cycle of a polarity opposite to said first polarity.

15. In a control circuit for effecting the passage of alternating current to a load, a source of alternating voltage, an electronic tube connected across said source, a relay having its coil in series with said tube, a switch closed by said relay for initiating the load current flow, said relay having a mechanical delay in operation whereby said switch is closed by said relay a predetermined time after energization of said relay, and means for initiating conduction of said tube only at the beginning of half cycles of said alternating voltage whereby said coil is energized only by full half cycles of current, said switch thereby being closed to initiate current flow through the load a predetermined time following the beginning of a half cycle of said alternating voltage.

16. In a control circuit for effecting the passage of alternating current to a load, a source of alternating voltage, an electronic tube connected across said source, a relay having its coil in series with said tube, a switch closed by said relay for initiating the load current flow, said relay having a predetermined mechanical delay in operating whereby said switch is operated by said relay a predetermined time after a change in the energization thereof, means for initiating conduction of said tube only at the beginning of a half cycle of said alternating voltage whereby said coil is energized only by full half cycles of current, said switch thereby being closed to initiate current flow through the load a predetermined time following the beginning of a half cycle of said alternating voltage, means operative at the end of a half cycle of said alternating voltage for preventing further conduction of said tube, and energy storing means including capacitive and inductive means in circuit with said coil and of reactive values to provide for a substantial exchange of energy therebetween for effecting the deenergization of said coil a predetermined time after cessation of current flow through said tube whereby said switch is opened a predetermined time after the end of a half cycle of said alternating voltage.

17. In a circuit arrangement for effecting operation of a relay, a source of alternating voltage, an electronic tube, means connecting said electronic tube across said source of voltage, a circuit including a relay coil connected in series with said electronic tube, capacitive energy storing means in said circuit for maintaining current flow in the normal direction through said relay coil during the half cycles immediately following periods of conduction of said electronic tube to maintain said relay coil energized, said circuit having capacitive and inductive reactive values of such magnitude that a substantial exchange of energy occurs following the aforesaid half cycles so that said relay coil is rapidly deenergized, and means associated with said relay coil and operated upon energization thereof to effect a control function.

18. A control circuit for effecting the passage of alternating current to a load of substantially constant power factor, a source of alternating voltage, an electronic tube energized by said source, a relay having a coil in series with said tube so as to be energized by current flow therethrough, a switch operated by said relay and closed to effect load current flow, means for synchronously energizing said tube, said relay being thereby synchronously energized, said relay having a predetermined mechanical delay between the instant of initial energization and the instant of closure of said switch of such duration as to effect closure of said switch at approximately the normal current zero for a circuit of such power factor whereby load current is initiated substantially without transients, and means for synchronously interrupting current flow through said tube to thereby deenergize said relay and effect opening of said switch.

ERNEST G. ANGER.

REFERENCES CITED

The following references are of record in the file of this patent:

UNITED STATES PATENTS

| Number | Name | Date |
|---|---|---|
| 2,287,504 | Warrington | June 23, 1942 |
| 2,354,086 | McCay | July 18, 1944 |
| 2,372,005 | Kinsman | Mar. 20, 1945 |
| 2,390,981 | Bivens | Dec. 18, 1945 |
| 2,390,982 | Bivens | Dec. 18, 1945 |
| 2,393,014 | Bartholy | Jan. 15, 1946 |
| 2,422,020 | Kingsmill | June 10, 1947 |
| 2,431,284 | Stadum | Nov. 18, 1947 |
| 2,441,789 | Bivens | May 18, 1948 |
| 2,443,660 | Large | June 22, 1948 |
| 2,468,418 | Thumin | Apr. 26, 1949 |
| 2,492,749 | Hills | Dec. 27, 1949 |
| 2,494,352 | Moyer | Jan. 10, 1950 |
| 2,532,111 | Longini | Nov. 28, 1950 |
| 2,552,137 | Bivens | May 8, 1951 |